(12) United States Patent  (10) Patent No.: US 9,079,504 B2
Amano et al.  (45) Date of Patent: Jul. 14, 2015

(54) ELECTRIC AUTOMOBILE (71) Applicant: HONDA MOTOR CO., LTD., Tokyo (JP)

(72) Inventors: Atsushi Amano, Utsunomiya (JP); Ryoji Tomokage, Utsunomiya (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/357,278

(22) PCT Filed: Oct. 17, 2012

(86) PCT No.: PCT/JP2012/076789
§ 371 (c)(1),
(2) Date: May 9, 2014

(87) PCT Pub. No.: WO2013/073327
PCT Pub. Date: May 23, 2013

(65) Prior Publication Data
US 2015/0034400 A1  Feb. 5, 2015

(30) Foreign Application Priority Data

Nov. 14, 2011 (JP) .................................. 2011-248161

(51) Int. Cl.
B60K 5/08 (2006.01)
B60L 11/18 (2006.01)
B60K 26/02 (2006.01)

(52) U.S. Cl.
CPC ............. B60L 11/1818 (2013.01); B60K 26/02 (2013.01); B60L 11/1809 (2013.01); B60Y 2400/61 (2013.01); Y02T 10/7005 (2013.01); Y02T 90/14 (2013.01)

(58) Field of Classification Search
None
See application file for complete search history.

(56) References Cited

U.S. PATENT DOCUMENTS

2010/0025127 A1* 2/2010 Oyobe ........................ 180/65.22
2010/0116571 A1* 5/2010 Suzuki ........................ 180/65.25

FOREIGN PATENT DOCUMENTS

EP 2119585 A1 * 11/2009
EP 2179880 A1 * 4/2010
(Continued)

OTHER PUBLICATIONS

International Search Report dated Jan. 22, 2013 issued in corresponding application No. PCT/JP2012/076789.

Primary Examiner — J. Allen Shriver, II
Assistant Examiner — Hilary L Johns
(74) Attorney, Agent, or Firm — Westerman, Hattori, Daniels & Adrian, LLP (57) ABSTRACT An electric automobile in which a power control unit is disposed in a motor room formed at a front section of a vehicle: wherein a charging port or a power supply port is provided on a lateral surface of the front section of the vehicle; a charging connector or a power supply connector for connection to a charging power supply or an external device is attached to the charging port or the power supply port; the charging connector or the power supply connector is disposed in a manner so that a forward end thereof is located rearward of a forward end of a front wheel, and a rearward end thereof is located forward of a dash panel that partitions the motor room and a vehicle cabin; the charging connector or the power supply connector and the power control unit are connected by a cable; and a connection section between the cable and the power control unit is provided forward of the charging connector or the power supply connector.

3 Claims, 8 Drawing Sheets (56) References Cited

FOREIGN PATENT DOCUMENTS

| | | | |
|---|---|---|---|
| JP | 2000-253511 A | | 9/2000 |
| JP | 2004-304923 A | | 10/2004 |
| JP | 2004304923 A | * | 10/2004 |
| JP | 2009-247057 A | | 10/2009 |
| JP | 2009247057 A | * | 10/2009 |
| JP | 2010-247642 A | | 11/2010 |
| WO | 2008/111547 A1 | | 9/2008 |
| WO | 2009/028520 A1 | | 3/2009 |

* cited by examiner

ELECTRIC AUTOMOBILE

TECHNICAL FIELD

The present invention relates to an electric automobile.

Priority is claimed on Japanese Patent Application No. 2011-248161, filed Nov. 14, 2011, the content of which is incorporated herein by reference.

BACKGROUND ART

Patent Document 1 discloses an electric automobile with a charging port formed at a front section of a vehicle, and provided in the charging port with a charging connector (charging port) that enables charging by a domestic power supply, and a charging connector (charging port) for fast charge that enables charging at a charging rate faster than the charging from the charging connector for the domestic power supply.

DOCUMENT OF RELATED ART

Patent Document

[Patent Document 1] Japanese Unexamined Patent Application, First Publication No. 2010-247642

SUMMARY OF INVENTION

Problems to be Solved by the Invention

In the conventional electric automobile described in the above Patent Document, an impact at the time of a frontal collision with respect to a charging connector attached to a charging port is large, and it is desired to suppress the impact. Furthermore a cable that is arranged inside a vehicle to conduct power is connected to the charging connector, and it is also desired to enhance protection performance of the cable. Moreover, it is also desired to enhance the protection performance of the charging port.

Consequently, an aspect of the present invention has an object of providing an electric automobile that can improve protection performance of a charging connector or a power supply connector attached to a charging port or a power supply port, and a cable connected to the charging connector or the power supply connector and arranged inside a vehicle, at the time of a frontal collision.

Means for Solving the Problem

In order to solve the above problem and achieve the above object, the present invention adopts the following aspects.

(1) One aspect of the present invention is an electric automobile in which a power control unit is disposed in a motor room formed at a front section of a vehicle: wherein a charging port or a power supply port is provided on a lateral surface of the front section of the vehicle; a charging connector or a power supply connector for connection to a charging power supply or an external device is attached to the charging port or the power supply port; the charging connector or the power supply connector is disposed in a manner so that a forward end thereof is located rearward of a forward end of a front wheel, and a rearward end thereof is located forward of a dash panel that partitions the motor room and a vehicle cabin; the charging connector or the power supply connector and the power control unit are connected by a cable; and a connection section between the cable and the power control unit is provided forward of the charging connector or the power supply connector.

(2) In an aspect of (1) above, the connection section may be provided on an upper side of the power control unit.

(3) In an aspect of (2) above, the charging port may be provided respectively in a left front fender that is arranged on the left side at the front section of the vehicle to form the motor room, and in a right front fender that is arranged on the right side at the front section of the vehicle to form the motor room. The charging connector may include a charging connector for connection to a domestic power supply and a charging connector for connection to a fast charging power supply that enables charge at a charging rate faster than the charging from the domestic power supply. The charging connector for connection to the domestic power supply may be attached to one of the left and right charging ports, and the charging connector for connection to the fast charging power supply may be attached to the other.

Advantage of the Invention

In the aspect of (1), an impact (input force) from the front at the time of a frontal collision is absorbed by the front wheels located forward of the charging connector or the power supply connector. Therefore, the charging connector or the power supply connector is hardly damaged. Moreover, because the charging connector or the power supply connector is located forward of the dash panel, the charging connector or the power supply connector can be attached in the motor room, thereby facilitating attachment of the charging connector or the power supply connector to the vehicle body.

Furthermore, even if the power control unit is pushed back to the rear of the vehicle due to an input force from the front, a fore and aft distance of the charging connector or the power supply connector, and the connection section between the power control unit and the cable extending from the charging connector or the power supply connector is ensured. Hence, a structure such that the cable is hardly pulled by a rearward movement of the power control unit can be obtained, thereby enabling to enhance the protection performance of the cable.

In the case of (2), the connection section between the cable and the power control unit is provided on the upper side of the power control unit where access is easy. Hence maintenance is facilitated.

In the case of (3), the protection performance of the charging connector for connection to the domestic power supply, and the various cables that connect to the charging connector for connection to the fast charging power supply can be enhanced.

DESCRIPTION OF THE EMBODIMENTS

Hereunder, embodiments of the present invention will be described. In the drawings used hereunder, an arrow FR indicates a front side of a vehicle, an arrow UP indicates an upper side of the vehicle, and an arrow LH indicates a left side of the vehicle.

<First Embodiment>

Figure 1:
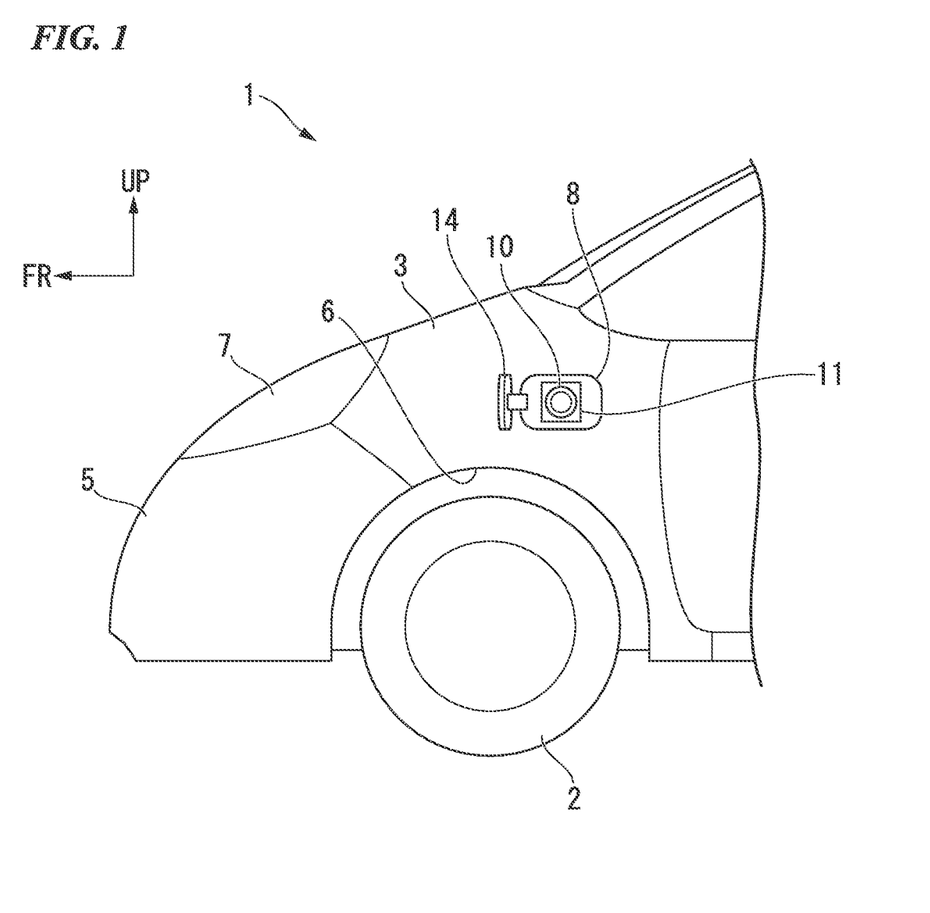
FIG. 1 is a front left side view of an electric automobile according to a first embodiment of the present invention.
Figure 2:
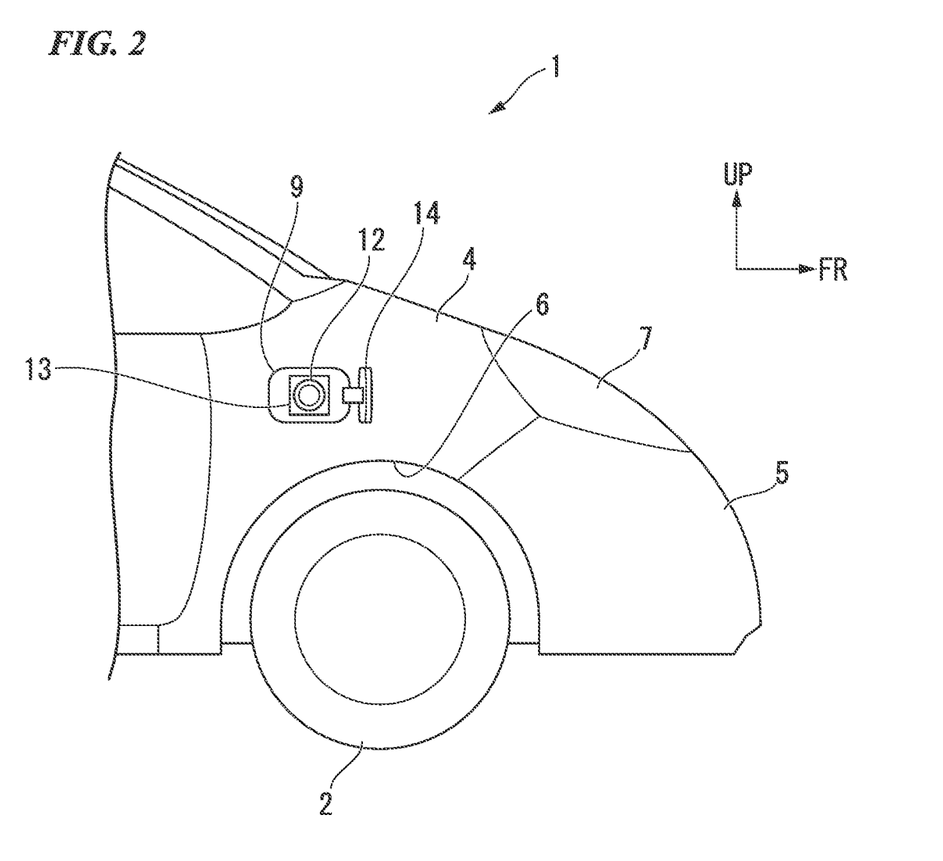
FIG. 2 is a front right side view of the electric automobile.

A vehicle front section of an electric automobile 1 according to a first embodiment of the present invention is shown in FIG. 1 and FIG. 2. A left front fender 3 and a right front fender 4 that cover left and right front wheels 2, are provided at the vehicle front section of the electric automobile 1. A bumper 5 extending in the vehicle width direction is provided between the left front fender 3 and the right front fender 4. A left-and-right pair of wheel houses 6 is formed by the left front fender 3, the right front fender 4, and the bumper 5, and front wheels 2 are provided in these wheel houses 6.

A left-and-right pair of headlights 7 is provided in an upper part of the opposite ends of the bumper 5. Rear sections of the respective headlights 7 continue smoothly to the left front fender 3 and the right front fender 4. Moreover, a hood (not shown) is provided between upper parts of the left front fender 3 and the right front fender 4.

A left charging port 8 (charging port or power supply port) that is opened when power is charged from a domestic power supply, is provided at a portion located above the front wheel 2 in the left front fender 3. A right charging port 9 (charging port or power supply port) that is opened when power is charged from a fast charging power supply, is provided at a portion located above the front wheel 2 in the right front fender 4. The respective charging ports 8 and 9 are openably covered with lids 14.

An attachment portion 11 for attaching a domestic power supply external connection connector 10 (charging connector or power supply connector) for connection to a domestic power supply, is provided in the left charging port 8. An attachment portion 13 for attaching a fast-charging external connection connector 12 (charging connector or power supply connector) for connection to a fast charging power supply, is provided in the right charging port 9. The domestic power supply external connection connector 10 is fixed and supported by the attachment portion 11, and the fast-charging external connection connector 12 is fixed and supported by the attachment portion 13. The attachment portions 11 and 13 are formed of, for example, a plate-like bracket provided in the charging port.

Figure 3:
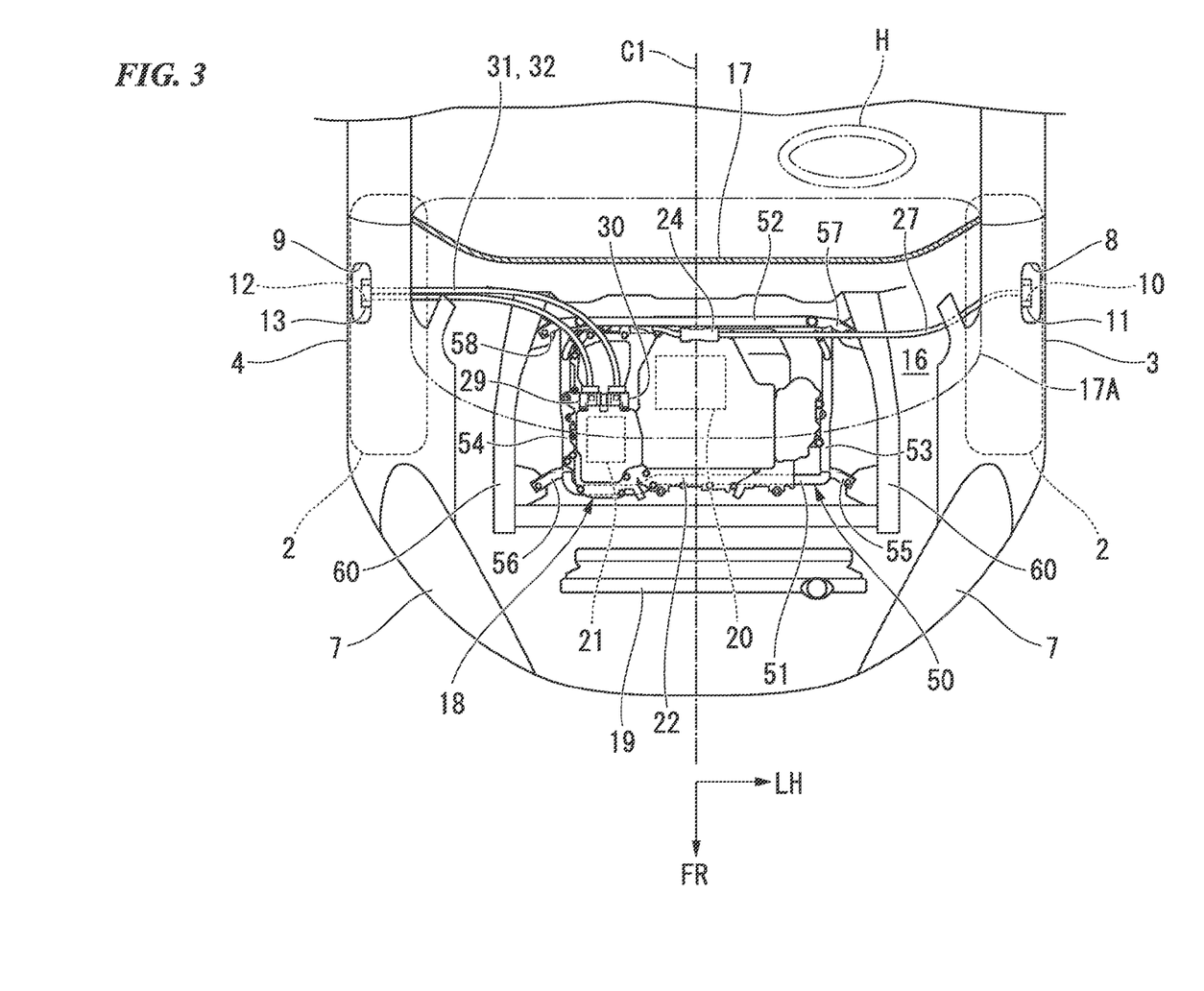
FIG. 3 is a front upper view of the electric automobile.

With reference to FIG. 3, a motor room 16 is formed below the hood and between the left front fender 3 and the right front fender 4. The rear section of the left front fender 3 and the rear section of the right front fender 4 continue to the opposite ends of a dash panel 17 extending in the vehicle width direction to form the motor room 16. The motor room 16 and a vehicle cabin rearward of the motor room 16 are partitioned by the dash panel 17. In the present embodiment, the upper part of the dash panel 17 extends relatively long toward the front of the vehicle. Reference symbol 17A in FIG. 3 denotes a dash panel upper part 17A. For convenience of explanation, the dash panel upper part 17A is indicated by a two-dot chain line.

A power control unit (hereinafter, PCU (Power Control Unit)) 18 that controls a motor, is arranged substantially at the center of the motor room 16 in the vehicle width direction, and a driving motor (not shown) is arranged below the PCU 18. A radiator 19 is arranged in front of the PCU 18. The radiator 19 cools a drive train coolant for the motor and the PCU 18, and a coolant for an electric storage device (not shown), by heat exchange with outside air, which is traveling wind.

The domestic power supply external connection connector 10 on the left charging port 8 side, and the fast-charging external connection connector 12 on the right charging port 9 side are arranged on either side of the PCU 18, in other words, arranged at positions facing each other, on either side of a center line C1 in the vehicle width direction (at symmetrical positions). Here respective front ends of the domestic power supply external connection connector 10 and the fast-charging external connection connector 12, are located rearward of the front ends of the front wheels 2, and the rear ends thereof are located forward of the dash panel 17.

Moreover, the electric automobile 1 is a left-hand drive model, and a steering wheel H is provided on the left side in the vehicle cabin. The domestic power supply external connection connector 10 is attached to the left charging port 8 in the left front fender 3 on the steering wheel H side, and the fast-charging external connection connector 12 is attached to the right charging port 9 located on a passenger side.

The PCU 18 is configured to house components in a case body 22 which has an approximately rectangular shape in a top view, the components such as; an inverter that converts power from the electric storage device from DC to AC, a control device that controls the inverter, a domestic power supply charging device that can accumulate power from the domestic power supply in the electric storage device, and a fast-charging device that can accumulate power from the fast-charging power supply having a higher voltage than that of the domestic power supply in the electric storage device at a faster charging rate than the charging rate from the domestic power supply.

The PCU 18 is supported by a unit support frame 50 having a rectangular frame shape as seen in a top view. The unit support frame 50 is arranged so as to surround four sides of the PCU 18. The unit support frame 50 is formed by bonding a plurality of steel pipe materials, and includes a front extending portion 51 located forward of a front wall of the PCU 18, a rear extending portion 52 located rearward of a rear wall of the PCU 18, a left extending portion 53 that connects a left end of the front extending portion 51 and a left end of the rear extending portion 52, and a right extending portion 54 that connects a right end of the front extending portion 51 and a right end of the rear extending portion 52.

A front left leg 55, a front right leg 56, a rear left leg 57, and a rear right leg 58 are formed so as to extend downward at the respective corners where the front extending portion 51, the rear extending portion 52, the left extending portion 53, and the right extending portion 54 are connected respectively. The orientation of the unit support frame 50 is maintained by fastening lower ends of the respective legs 55 to 58 to a left-and-right pair of side frames 60. The PCU 18 is fastened to appropriate positions of the front extending portion 51, the rear extending portion 52, the left extending portion 53, and the right extending portion 54, and is supported by the unit support frame 50. The side frames 60 extend at the opposite sides of the PCU 18 in a fore and aft direction of the vehicle as seen in a top view.

In FIG. 3, for convenience of explanation, a domestic power supply charging device 20 and a fast-charging device 21 housed in the PCU 18 are shown. The domestic power supply charging device 20 is configured to include an AC/DC converter, and the like. The fast-charging device 21 is configured to include a contactor for accumulating in a stepwise manner, voltage from the fast-charging power supply, in the electric storage device, and the like.

Figure 4:
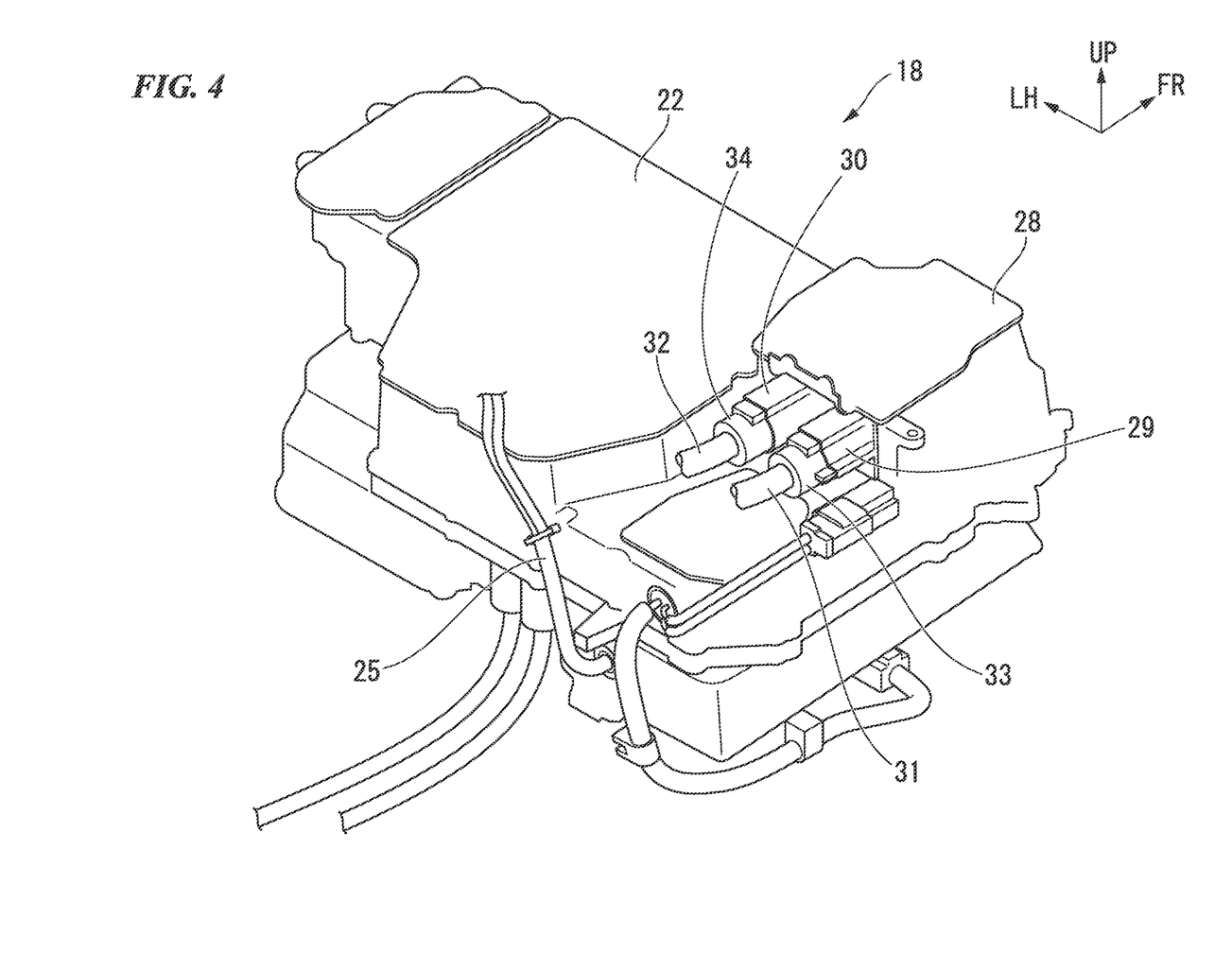
FIG. 4 is a perspective view of a power control unit provided in the electric automobile

With reference to FIG. 4, a charging cable 25 for inputting power to the PCU 18, is connected to a lower part on the right side of a rear wall of the case body 22 of the PCU 18. The charging cable 25 extends upward along the rear wall toward the inside in the vehicle width direction.

Figure 5:
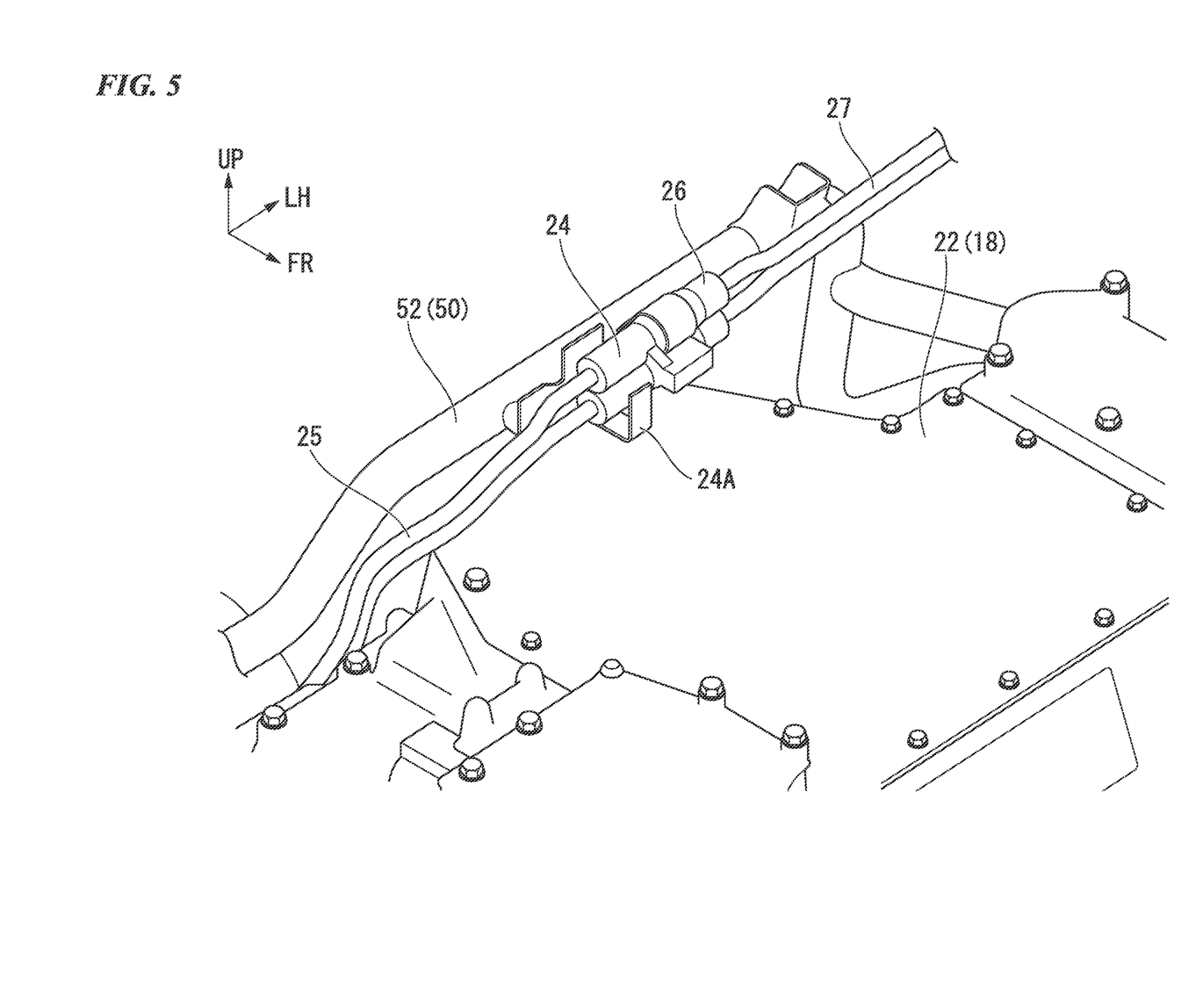
FIG. 5 is a perspective view showing a connection connector provided in the power control unit for connection to a charging cable.

With reference to FIG. 5, the charging cable 25 extends leftward from an upper part of a top wall of the case body 22, and a connection connector 24 (connecting portion) is integrally provided at the end of the charging cable 25.

The connection connector 24 is attached to a bracket 24A fixed to the front side of the rear extending portion 52 of the unit support frame 50, with an attachment opening thereof facing leftward. A domestic power supply charging cable 27 (cable) having the domestic power supply external connection connector 10 at one end, and a domestic power supply internal connection connector 26 for connection to the connection connector 24 at the other end, is detachably connected to the connection connector 24 via the domestic power supply internal connection connector 26.

By inserting the domestic power supply internal connection connector 26 into the connection connector 24 rightward, the domestic power supply charging cable 27 is connected to the connection connector 24. As shown in FIG. 3, the domestic power supply charging cable 27 is extended from the connection connector 24 leftward along the rear extending portion 52 of the unit support frame 50, and is arranged so that the domestic power supply external connection connector 10 is located in the left charging port 8. The connection connector 24 is arranged forward of the domestic power supply external connection connector 10.

Moreover, in the present embodiment, the domestic power supply charging cable 27 is extended leftward from the connection connector 24 along the rear extending portion 52 of the unit support frame 50. The domestic power supply charging cable 27 is not arranged above the case body 22, and is covered with the dash panel upper part 17A. Consequently, the domestic power supply charging cable 27 is not easily visible at the time of opening the hood.

On the other hand, as shown in FIG. 4, a storage part 28 having a rectangular shape in cross section that protrudes upward to house the fast-charging device 21, is formed on the front side of a right upper part of the case body 22 of the PCU 18. A positive connector 29 and a negative connector 30 for connection to the fast-charging device 21, are respectively provided on the rear wall of the storage part 28, with an attachment opening facing rearward.

A positive fast-charging cable 31 (cable) is connected to the positive connector 29, and a negative fast-charging cable 32 (cable) is connected to the negative connector 30. The positive fast-charging cable 31 and the negative fast-charging cable 32 are integrally provided with fast-charging internal connection connectors 33 and 34 for connection to the positive connector 29 and the negative connector 30 at one end thereof, respectively.

Moreover, as shown in FIG. 3, the other ends of the positive fast-charging cable 31 and the negative fast-charging cable 32 are integrally formed with the fast-charging external connection connector 12. The fast-charging external connection connector 12 holds the other ends of the positive fast-charging cable 31 and the negative fast-charging cable 32 collectively.

The positive fast-charging cable 31 and the negative fast-charging cable 32 are detachably connected to the respective connectors by inserting the fast-charging internal connection connectors 33 and 34 into the positive connector 29 and the negative connector 30 respectively toward the front. The positive fast-charging cable 31 and the negative fast-charging cable 32 are respectively extended rightward, and are arranged so that the fast-charging external connection connector 12 is located in the right charging port 9. The positive connector 29 and the negative connector 30 are arranged forward of the fast-charging external connection connector 12.

In the above configuration, the domestic power supply charging device 20 is configured to be able to receive power from the domestic power supply via the domestic power supply charging cable 27 and the charging cable 25 when the domestic power supply is connected to the domestic power supply external connection connector 10. Meanwhile, the fast-charging device 21 is configured to be able to receive power from the fast-charging power supply via the positive fast-charging cable 31 and the negative fast-charging cable 32 when the fast-charging power supply is connected to the positive fast-charging cable 31 and the negative fast-charging cable 32.

In the electric automobile 1 described above, because an impact (input force) from the front at the time of a frontal collision is absorbed by the front wheels 2 located forward of the charging connectors (domestic power supply external connection connector 10 and fast-charging external connection connector 12), these charging connectors are hardly damaged. Moreover, because the charging connectors are located forward of the dash panel 17, the charging connectors can be attached in the motor room 16, thereby facilitating attachment of the charging connectors to the vehicle body.

Furthermore, even if the PCU 18 is pushed back to the rear of the vehicle due to an input force from the front, a fore and aft distance of the charging connector and the connection section (connection connector 24, positive connector 29, and negative connector 30) between the PCU 18 and the cable (domestic power supply charging cable 27, positive fast-charging cable 31, and negative fast-charging cable 32) extending from the charging connector is ensured. Hence, a structure such that the high tension cable is hardly pulled by a rearward movement of the PCU 18 can be obtained, thereby enabling to enhance the protection performance of the cable.

Moreover, in the electric automobile 1, the connection connector 24 is provided on the upper side of the PCU 18. In this case, because the connection connector 24 is provided on the upper side of the PCU 18 where access is easy, maintenance is facilitated.

<Second Embodiment>

A second embodiment of the present invention will be described next with reference to FIG. 6 to FIG. 8. In the present embodiment, the arrangement of a connection connector 24 is different from that of the first embodiment. In the description below, components the same as in the first embodiment are denoted by the same reference symbols, and description thereof is omitted.

Figure 6:
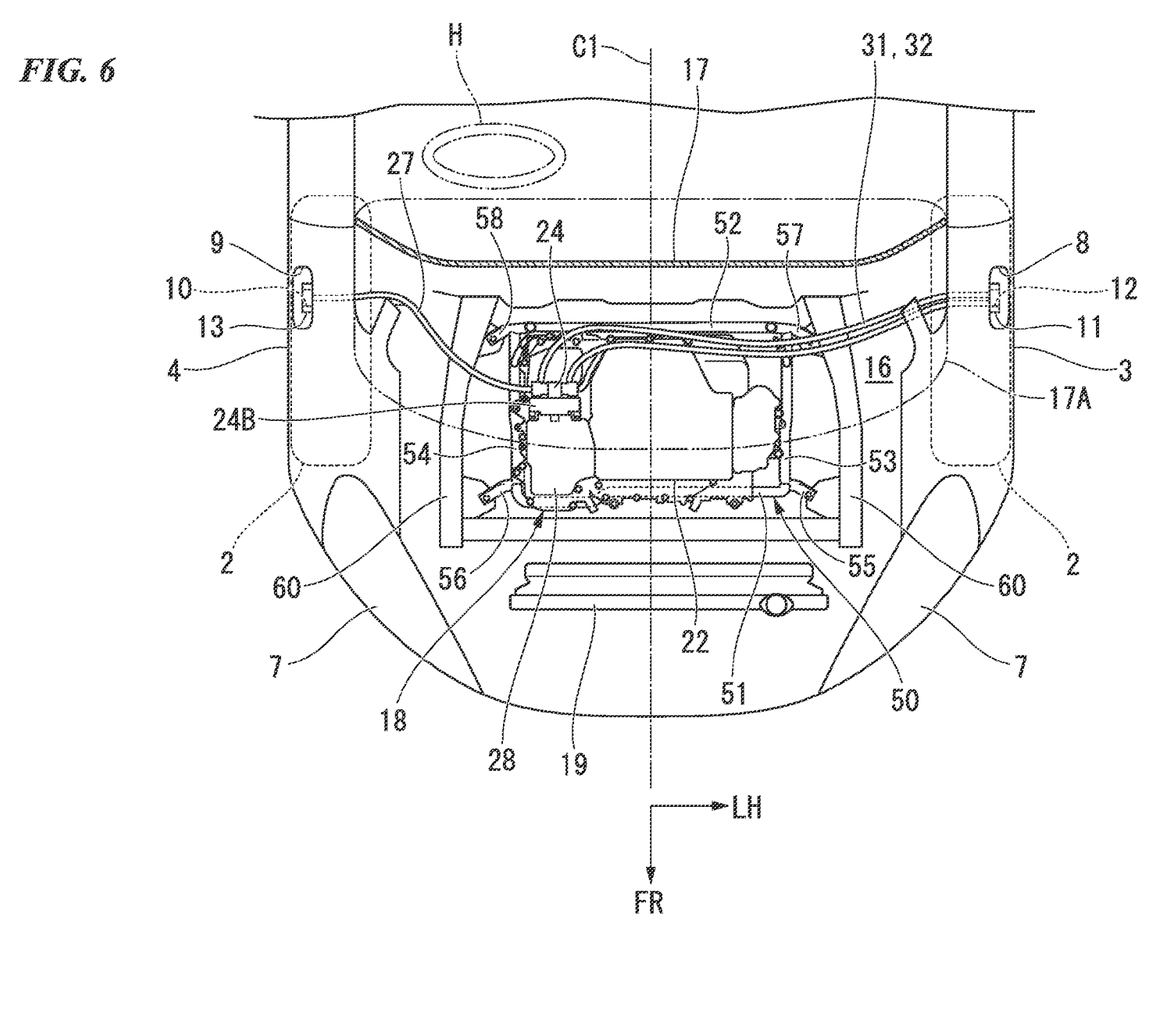
FIG. 6 is a front upper view of an electric automobile according to a second embodiment of the present invention.
Figure 7:
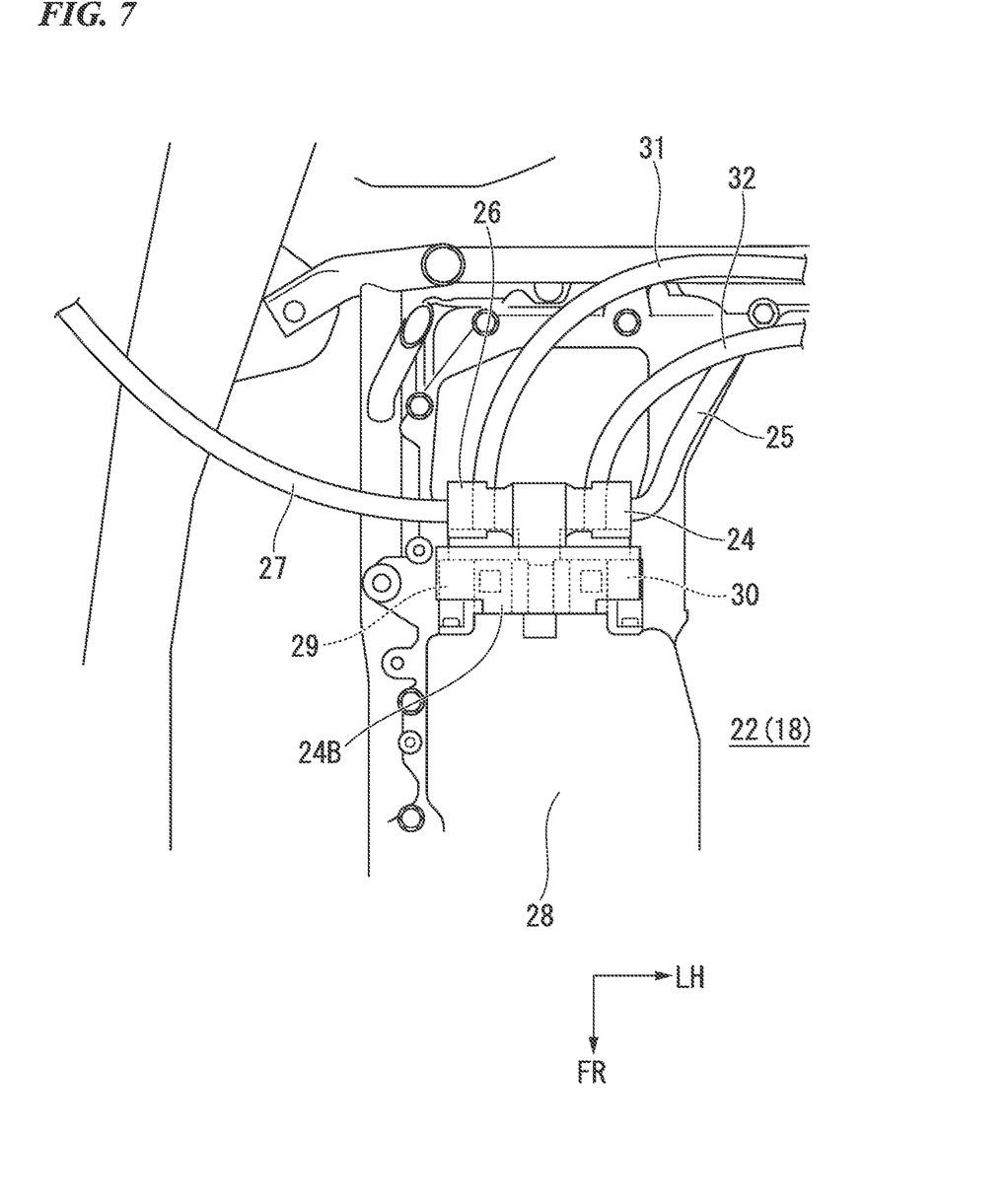
FIG. 7 is an enlarged view of a relevant part in FIG. 7.
Figure 8:
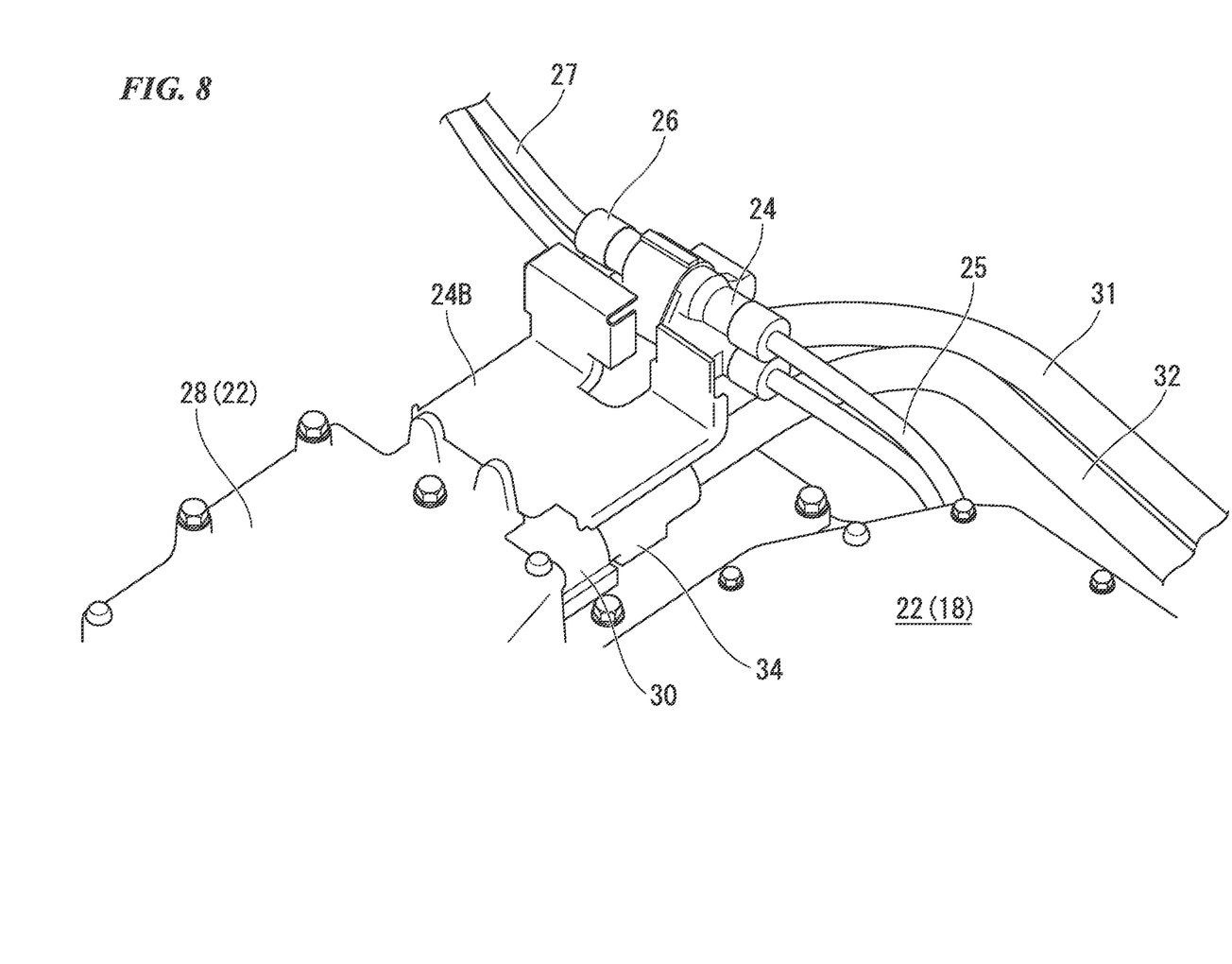
FIG. 8 is a perspective view showing a connection connector provided in the power control unit according to the second embodiment, for connection to a charging cable.

As shown in FIG. 6 to FIG. 8, in the present embodiment, a plate-like bracket 24B is attached to a rear part of a storage part 28 of a case body 22 so as to extend backward, and a connection connector 24 is attached to the rear part of the bracket 24B. An attachment opening of the connection connector 24 faces rightward, and a charging cable 25 is connected to the left end thereof. The charging cable 25 extends upward along the rear wall of the case body 22, and is then extended rightward and connected to the connection connector 24.

In the present embodiment, a vehicle is a right-hand drive model, and a domestic power supply charging cable 27 is extended rightward from the connection connector 24. A domestic power supply external connection connector 10 is arranged in a right charging port 9.

A part of a fast-charging positive connector 29 and a fast-charging negative connector 30 is covered with the bracket 24B from above. A positive fast-charging cable 31 and a negative fast-charging cable 32 are passed through under the connection connector 24, and then extended leftward along a rear extending portion 52 of a unit support frame 50. A fast-charging external connection connector 12 is arranged in a left charging port 8.

Also in the present embodiment, the connection connector 24 is located forward of the domestic power supply external connection connector 10, and the positive connector 29 and the negative connector 30 are located forward of the fast-charging external connection connector 12.

Moreover, in the present embodiment, the domestic power supply charging cable 27 passes above only a part of the rear right side of the case body 22, and the positive fast-charging cable 31 and the negative fast-charging cable 32 are extended leftward along the rear extending portion 52 of the unit support frame 50. Cables and the like are minimally arranged above the case body 22, and the case body 22 is covered with a dash panel upper part 17A. Consequently, the cables and the like are not easily visible at the time of opening the hood. Furthermore, the positive fast-charging cable 31 and the negative fast-charging cable 32 are passed through under the connection connector 24 to intersect with the connection connector 24, thereby improving the efficiency of the arrangement space of the cables and the like.

Also in the second embodiment described above, because an impact (input force) from the front at the time of a frontal collision is absorbed by the front wheels 2 located forward of the charging connectors (domestic power supply external connection connector 10 and fast-charging external connection connector 12), these charging connectors are hardly damaged. Moreover, because the charging connectors are located forward of the dash panel 17, the charging connectors can be attached in the motor room 16, thereby facilitating attachment of the charging connectors to the vehicle body.

Furthermore, even if the PCU 18 is pushed back to the rear of the vehicle due to an input force from the front, a fore and aft distance of the charging connector and the connection section (connection connector 24, positive connector 29, and negative connector 30) between the PCU 18 and the cable (domestic power supply charging cable 27, positive fast-charging cable 31, and negative fast-charging cable 32) extending from the charging connector is ensured. Hence, a structure such that the cable is hardly pulled by a rearward movement of the PCU 18 can be obtained, thereby enabling to enhance the protection performance of the cable.

The embodiments of the present invention have been described above. However, the present invention is not limited thereto, and various changes can be made without departing from the scope of the present invention.

For example, in the above embodiments, the configuration in which the domestic power supply external connection connector 10 and the fast-charging external connection connector 12 are attached to the left charging port 8 and the right charging port 9 has been described. However, the configuration may be such that the domestic power supply external connection connector 10 and an external connection connector of a power supply cable are attached to the left charging port 8 and the right charging port 9. Moreover, the configuration may be such that the fast-charging external connection connector 12 and the external connection connector of the power supply cable are attached to the left charging port 8 and the right charging port 9.

INDUSTRIAL APPLICABILITY

According to the present invention, an electric automobile that can improve the protection performance of the charging connector or the power supply connector attached to the charging port or the power supply port, and the cable connected to the charging connector or the power supply connector and arranged inside the vehicle, at the time of a frontal collision, can be provided.

DESCRIPTION OF REFERENCE SYMBOLS

1 Electric automobile
3 Left front fender
4 Right front fender
8 Left charging port (charging port)
9 Right charging port (charging port)
10 Domestic power supply external connection connector (charging connector)
12 Fast-charging external connection connector (charging connector)
17 Dash panel
18 Power control unit
24 Connection connector (connecting portion)
27 Domestic power supply charging cable (high tension cable)
31 Positive fast-charging cable (high tension cable)
32 Negative fast-charging cable (high tension cable)

The invention claimed is:

1. An electric automobile in which a power control unit is disposed in a motor room formed at a front section of a vehicle:
   wherein a charging port or a power supply port is respectively provided in a left front fender that is arranged on the left side at the front section of the vehicle to form the motor room and a right front fender that is arranged on the right side at the front section of the vehicle to form the motor room;
   a charging connector or a power supply connector for connection to a charging power supply or an external device is attached to the charging port or the power supply port;
   the charging connector or the power supply connector is disposed in a manner so that a forward end thereof is located rearward of a forward end of a front wheel, and a rearward end thereof is located forward of a dash panel that partitions the motor room and a vehicle cabin;
   the charging connector or the power supply connector at the side of the left front fender and the power control unit are connected by a first cable;
   the charging connector or the power supply connector at the side of the right front fender and the power control unit are connected by a second cable; and
   a first connection section between the first cable and the power control unit and a second connection section between the second cable and the power control unit are provided forward of the charging connector or the power supply connector, on an upper surface or a rear surface of a surface constituting an exterior of the power control unit, and are overlapped with each other in a vertical direction.

2. The electric automobile according to claim 1, wherein the first connection section and the second connection section are provided on an upper side of the power control unit.

3. The electric automobile according to claim 1, wherein the charging port is provided respectively in the left front fender and the right front fender;

the charging connector includes a charging connector for connection to a domestic power supply and a charging connector for connection to a fast charging power supply that enables charge at a charging rate faster than the charging from the domestic power supply; and the charging connector for connection to the domestic power supply is attached to one of the left and right charging ports, and the charging connector for connection to the fast charging power supply is attached to the other.

* * * * *